United States Patent
Bruni et al.

(10) Patent No.: US 12,215,597 B1
(45) Date of Patent: Feb. 4, 2025

(54) GAS TURBINE ENGINE ROTOR BLADE GEOMETRY AND METHOD FOR SELECTING SAME

(71) Applicant: Pratt & Whitney Canada Corp., Longueuil (CA)

(72) Inventors: Anthony Bruni, Toronto (CA); Jason Nichols, Mississauga (CA); Ramy Rashad, Oakville (CA); Mohammadreza Amiralaei, Richmond Hill (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/424,383

(22) Filed: Jan. 26, 2024

(51) Int. Cl.
*F01D 5/14* (2006.01)
*F04D 29/28* (2006.01)

(52) U.S. Cl.
CPC ........... *F01D 5/141* (2013.01); *F04D 29/284* (2013.01); *F05D 2220/323* (2013.01)

(58) Field of Classification Search
CPC . F01D 5/141; F01D 5/16; F01D 5/147; F01D 5/20; F01D 5/145; F01D 9/041; F01D 21/045; F01D 25/06; F01D 5/10; F01D 5/12; F01D 5/148; F01D 5/18; F01D 5/34; F04D 29/284; F04D 29/324; F04D 29/384; F04D 29/388; F04D 29/544; F04D 29/666; F04D 29/327; F05D 2240/303; F05D 2220/323; F05D 2220/36; F05D 2240/301; F05D 2240/306; F05D 2240/305; F05D 2240/307; F05D 2240/121; F05D 2250/611; F05D 2250/711; F05D 2250/712; F05D 2260/941; F05D 2260/96; F05D 2230/10; F05D 2240/123; F05D 2240/124; F05D 2240/30; F05D 2250/294; F05D 2250/90; F05B 2250/611

See application file for complete search history.

(56) References Cited

U.S. PATENT DOCUMENTS

| | | | |
|---|---|---|---|
| 6,071,077 A * | 6/2000 | Rowlands | F01D 5/147 416/DIG. 5 |
| 6,328,532 B1 * | 12/2001 | Hahnle | F01D 5/187 416/224 |
| 6,976,826 B2 | 12/2005 | Roy | |
| 7,108,486 B2 * | 9/2006 | Talbotec | F04D 29/324 416/243 |

(Continued)

*Primary Examiner* — Eric J Zamora Alvarez
(74) *Attorney, Agent, or Firm* — Getz Balich LLC (57) ABSTRACT

An aircraft propulsion system includes a bladed rotor configured for rotation about a rotational axis. A rotor blade of the bladed rotor of rotor blades includes a blade body. The blade body has a blade span extending between and to a base end and a tip end. The blade body has a blade chord extending between and to a leading edge and a trailing edge. The blade body forms a pressure side surface and a suction side surface. The blade body forms a recess at the pressure side surface. The recess includes a recess surface portion forming a portion of the pressure side surface. The recess surface portion has a recess height. The recess height is greater than or equal to a Y-value of 0.025 for a normalized two-dimensional curve of a surface profile of the recess surface portion taken along a Y-Z plane orthogonal to the rotational axis for a recess span.

14 Claims, 8 Drawing Sheets

(56) References Cited

U.S. PATENT DOCUMENTS

| | | | |
|---|---|---|---|
| 7,281,894 B2 * | 10/2007 | Lee | F01D 5/20 |
| | | | 415/173.1 |
| 8,393,872 B2 * | 3/2013 | Kirtley | F01D 5/141 |
| | | | 416/243 |
| 9,382,916 B2 * | 7/2016 | Schoenenborn | F01D 5/34 |
| 9,556,742 B2 * | 1/2017 | Parkin | B29D 99/0025 |
| 9,650,914 B2 | 5/2017 | Lecuyer | |
| 10,408,070 B2 * | 9/2019 | Mahias | F01D 9/02 |
| 10,837,286 B2 * | 11/2020 | Jain | F04D 29/384 |
| 10,907,648 B2 * | 2/2021 | Vogiatzis | F04D 29/324 |
| 11,203,935 B2 | 12/2021 | Hiernaux | |
| 11,255,199 B2 | 2/2022 | Burney | |
| 11,808,175 B2 | 11/2023 | Vogiatzis | |
| 11,954,408 B2 | 4/2024 | Rose | |
| 12,012,865 B2 | 6/2024 | Glavicic | |
| 2009/0155082 A1 | 6/2009 | Duong | |
| 2017/0175776 A1 * | 6/2017 | Theratil | F01D 5/16 |
| 2017/0218976 A1 * | 8/2017 | McGill | F04D 29/388 |
| 2024/0263942 A1 | 8/2024 | Figaschewsky | |

* cited by examiner

GAS TURBINE ENGINE ROTOR BLADE GEOMETRY AND METHOD FOR SELECTING SAME

TECHNICAL FIELD

This disclosure relates generally to rotor blade geometry for a gas turbine engine rotor blade and, more particularly, to a rotor blade body including a pressure-side recess geometry and a method for selecting the recess geometric characteristics.

BACKGROUND OF THE ART

Rotational equipment, such as a gas turbine engine for an aircraft propulsion system, may include one or more bladed rotors (e.g., a compressor rotor, a turbine rotor, a fan rotor, etc.). During operation of the rotational equipment, the rotor blades of a bladed rotor may experience significant stress, negatively affecting their operational life. Various rotor blade configurations are known in the art. While these known rotor blade configurations have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system includes a bladed rotor. The bladed rotor is configured for rotation about a rotational axis. The bladed rotor includes a plurality of rotor blades. Each rotor blade of the plurality of rotor blades includes a blade body. The blade body extends between and to a base end and a tip end. The blade body has a blade span extending between and to the base end and the tip end. The blade body extends between and to a leading edge and a trailing edge. The blade body has a blade chord extending between and to the leading edge and the trailing edge. The blade body forms a pressure side surface and a suction side surface. Each of the pressure side surface and the suction side surface extend between and to the base end and the tip end and between and to the leading edge and the trailing edge. The blade body forms a recess at the pressure side surface. The recess includes a recess surface portion forming a portion of the pressure side surface. The recess surface portion has a recess height. The recess height is greater than or equal to a Y-value of 0.025 for a normalized two-dimensional curve of a surface profile of the recess surface portion taken along a Y-Z plane orthogonal to the axial centerline for a recess span. A Z-direction of the Y-Z plane extends in a span direction of the blade span. A Y-direction of the Y-Z plane extends orthogonal to the Z-direction. The recess span extends between and to a minimum span position and a maximum span position in the Z-direction. The recess height is a maximum height measured in the Y-direction between the two-dimensional curve and a straight line intersecting the two-dimensional curve at the minimum span position and the maximum span position.

In any of the aspects or embodiments described above and herein, the recess height may be less than or equal to the Y-value of 0.1.

In any of the aspects or embodiments described above and herein, the recess height may be greater than or equal to the Y-value of 0.04.

In any of the aspects or embodiments described above and herein, the minimum span position may be equal to 15 percent of the blade span and the maximum span position may be equal to 90 percent of the blade span.

In any of the aspects or embodiments described above and herein, the minimum span position may be equal to 40 percent of the blade span and the maximum span position may be equal to 90 percent of the blade span.

In any of the aspects or embodiments described above and herein, the recess may extend axially along an axial chord of the blade chord between and to a minimum axial chord position and a maximum axial chord position. The minimum axial chord position may be greater than or equal to 50 percent of the axial chord and the maximum axial chord position may be less than or equal to 80 percent of the axial chord.

In any of the aspects or embodiments described above and herein, the recess height may be greater than or equal to the Y-value of 0.025 between and to the minimum axial chord position and the maximum axial chord position.

In any of the aspects or embodiments described above and herein, the recess surface portion may have a first recess shape which deviates from a second pressure side shape of surrounding portions of the pressure side surface.

In any of the aspects or embodiments described above and herein, the bulge surface portion may have a first bulge shape which deviates from a second suction side shape of surrounding portions of the suction side surface.

In any of the aspects or embodiments described above and herein, the aircraft propulsion system may further include a compressor section. The compressor section may include the bladed rotor.

According to another aspect of the present disclosure, a method includes observing a Y-Z plane orthogonal to a rotational axis of a blade body of a rotor blade. A Z-direction of the Y-Z plane extends in a span direction of the blade body. A Y-direction of the Y-Z plane extends orthogonal to the Z-direction. The method further includes intersecting the Y-Z plane with a recess forming a portion of a pressure side surface of the blade body to obtain a two-dimensional curve of a surface profile of the pressure side surface, extracting and normalizing Y-coordinates and Z-coordinates of the two-dimensional curve to determine a normalized two-dimensional curve of the surface profile of the pressure side surface, determining a straight-line equation for a straight line intersecting the normalized two-dimensional curve at a minimum span position and a maximum span position for the recess, and selecting a recess height of the bulge such that the recess height is greater than or equal to a Y-value of 0.025 and less than or equal to the Y-value of 0.1, and the recess height is a maximum height measured in the Y-direction between the two-dimensional curve and the straight line.

In any of the aspects or embodiments described above and herein, selecting the recess height may further includes selecting the recess height within a recess axial chord of the recess extending between and to a minimum axial chord position and a maximum axial chord position. The minimum axial chord position may be greater than or equal to 50 percent of a blade axial chord of the blade body and the maximum chord position may be less than or equal to 80 percent of the blade axial chord.

In any of the aspects or embodiments described above and herein, selecting the recess height may further include selecting the recess height greater than or equal to the Y-value of 0.025 and less than or equal to the Y-value of 0.1 for a plurality of axial positions, relative to the rotational axis, between and to the minimum axial chord position and the maximum axial chord position.

In any of the aspects or embodiments described above and herein, selecting the recess height may further include selecting the recess height such that the recess height is greater than or equal to the Y-value of 0.04.

In any of the aspects or embodiments described above and herein, the minimum span position may be less than or equal to 15 percent of a blade span of the blade body and the maximum span position may be greater than or equal to 90 percent of the blade span.

In any of the aspects or embodiments described above and herein, the method may further include rotating a bladed compressor rotor of a gas turbine engine about the rotational axis. The bladed compressor rotor may include the blade body with the selected recess height greater than or equal to the Y-value of 0.025 and less than or equal to the Y-value of 0.1.

According to another aspect of the present disclosure, a rotor blade for a bladed compressor rotor of an aircraft propulsion system includes a blade body. The blade body extends between and to a base end and a tip end. The blade body has a blade span extending between and to the base end and the tip end. The blade body extends between and to a leading edge and a trailing edge. The blade body has a blade chord extending between and to the leading edge and the trailing edge. The blade body forms a pressure side surface and a suction side surface. Each of the pressure side surface and the suction side surface extend between and to the base end and the tip end and between and to the leading edge and the trailing edge. The blade body forms a recess at the pressure side surface. The recess includes a recess surface portion forming a portion of the pressure side surface. The recess is disposed within a recess span extending in a span direction of the blade span. The recess span extends between and to minimum span position and a maximum span position. The minimum span position is less than or equal to 40 percent of the blade span. The maximum span position is equal to 90 percent of the blade span. The recess has a recess chord extending in a chord direction of the blade chord. The recess chord extends between and to minimum chord position and a maximum chord position. The recess chord is a portion of the blade chord. The recess surface portion has a first recess shape which deviates from a second pressure side shape of surrounding portions of the pressure side surface.

In any of the aspects or embodiments described above and herein, the blade body may form a bulge at the suction side surface coincident with the recess along the blade chord. The bulge includes a bulge surface portion forming a portion of the suction side surface.

In any of the aspects or embodiments described above and herein, the bulge surface portion may have a first bulge shape which deviates from a second suction side shape of surrounding portions of the suction side surface.

In any of the aspects or embodiments described above and herein, the minimum span position may be equal to 40 percent of the blade span.

The present disclosure, and all its aspects, embodiments and advantages associated therewith will become more readily apparent in view of the detailed description provided below, including the accompanying drawings.

DETAILED DESCRIPTION

Figure 1:
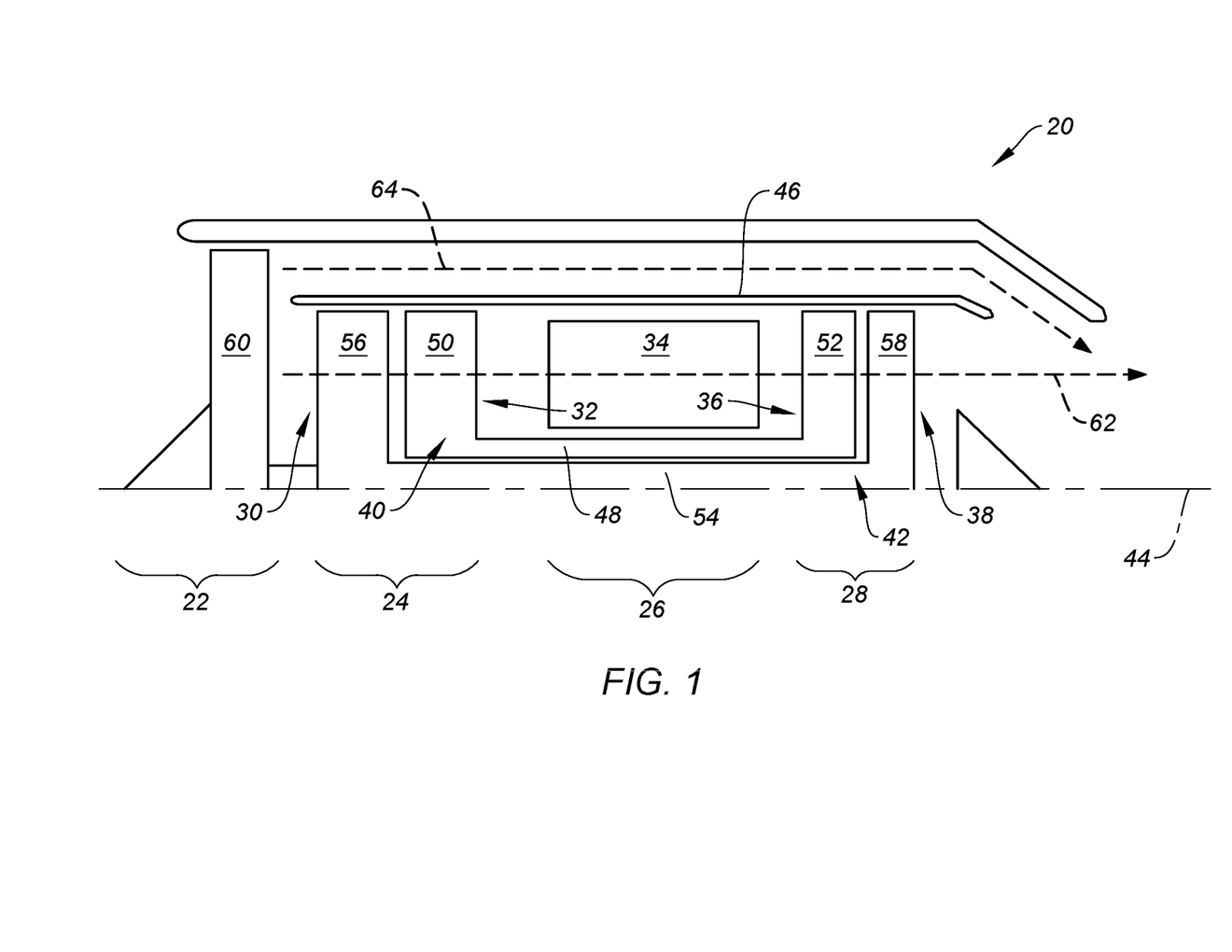
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine 20 of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor), and the turbine section 28 includes a high-pressure turbine (HPT) 36 and a low-pressure turbine (LPT) 38.

The gas turbine engine 20 sections 22, 24, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 54 may alternatively be configured for rotation about discrete rotational axes.

Figure 2:
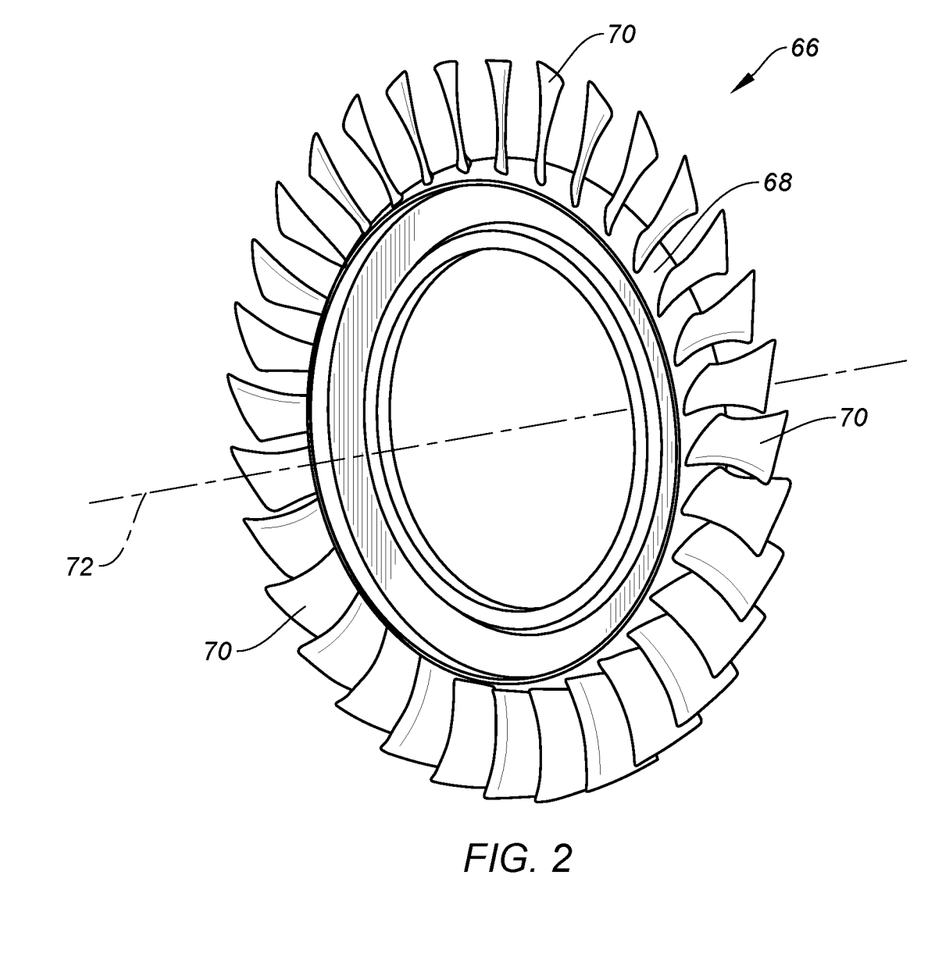
FIG. 2 illustrates perspective view of a bladed rotor for a gas turbine engine, in accordance with one or more embodiments of the present disclosure.

FIG. 2 illustrates a perspective view of an exemplary configuration of a bladed rotor 66. In particular, the bladed rotor 66 of FIG. 2 may be configured for use with a compressor (e.g., for the bladed first compressor rotor 50, the bladed second compressor rotor 56, or another compressor configuration) of a gas turbine engine or other rotational equipment. The present disclosure, however, is not limited to compressor rotor configurations and the bladed rotor 66 may be a bladed turbine rotor, a bladed fan rotor, or any other bladed rotor configuration. The bladed rotor 66 of FIG. 2 includes a disk 68 and a plurality of blades 70. The disk 68 extends circumferentially about (e.g., completely around) a rotational axis 72 (e.g., an axial centerline of the bladed rotor 66). The plurality of blades 70 are circumferentially distributed about the disk 68. The plurality of blades 70 are mounted to the disk 68 (e.g., to a radial periphery of the disk 68). Each of the plurality of blades 70 may be positioned within an axially extending slot (e.g., a dovetail slot) formed by the disk 68. Alternatively, the plurality of blades 70 may be formed with the disk 68 as a unitary component (e.g., the bladed rotor 66 may be configured as an integrated blade rotor (IBR) or "blisk"). The present disclosure, however, is not limited to any particular arrangement or mounting configuration of the plurality of blades 70 on the disk 68.

Figure 3:
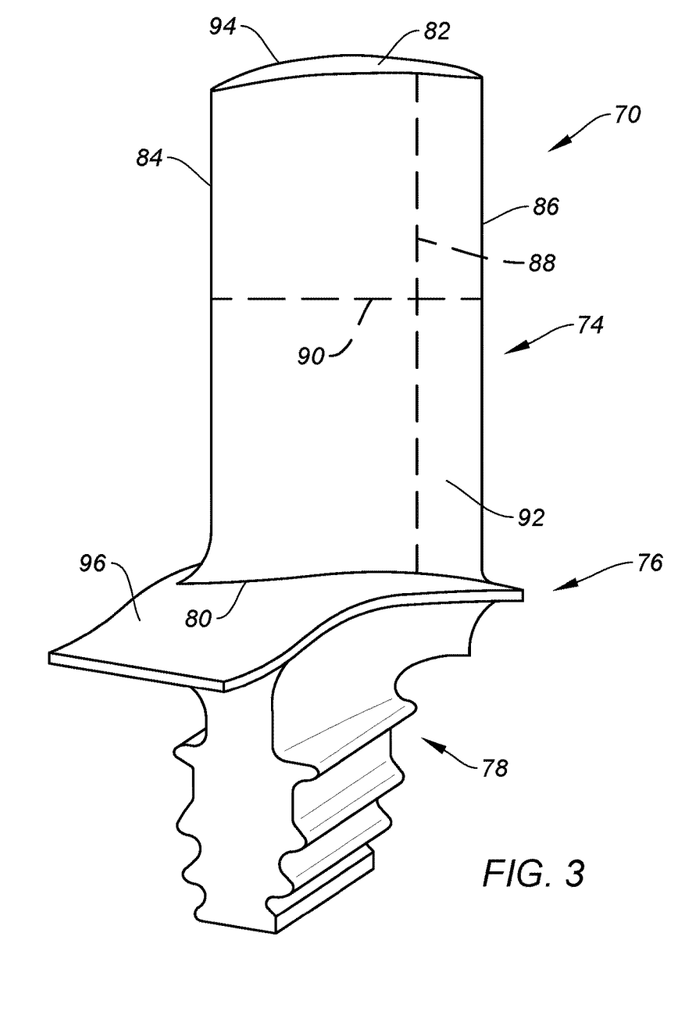
FIG. 3 illustrates a perspective view of a rotor blade for a bladed rotor, in accordance with one or more embodiments of the present disclosure.

FIG. 3 illustrates a perspective view of an exemplary configuration for one of the blades 70. The blade 70 of FIG. 3 includes a blade body 74, a platform 76, and a root 78.

The blade body 74 extends between and to a base end 80 of the blade body 74 and a tip end 82 of the blade body 74. The base end 80 is mounted to or otherwise disposed at (e.g., on, adjacent, or proximate) the platform 76. The tip end 82 is an outer radial end of the blade 70 relative to the rotational axis 72 (see FIG. 2). The blade body has a span 88 (e.g., a linear dimension) extending between and to the base end 80 and the tip end 82. The blade body 74 extends between and to a leading edge 84 of the blade body 74 and a trailing edge 86 of the blade body 74. The leading edge 84 and the trailing edge 86 extend between and to the base end 80 and the tip end 82. The blade body 74 has a chord 90 (e.g., a linear dimension) extending between and to the leading edge 84 and the trailing edge 86. The blade body 74 includes a pressure side surface 92 and a suction side surface 94. The pressure side surface 92 may be a generally concave surface of the blade body 74. However, the present disclosure is not limited to a concave or substantially concave pressure side surface 92 of the blade body 74, and the pressure side surface 92 may be alternatively shaped (e.g., straight, planar, etc.). The pressure side surface 92 is disposed opposite (e.g., circumferentially opposite) the blade body 74 from the suction side surface 94. The suction side surface 94 may be a generally convex surface of the blade body 74. However, the present disclosure is not limited to a concave or substantially convex suction side surface 94 of the blade body 74, and the suction side surface 94 may be alternatively shaped (e.g., straight, planar, etc.). The pressure side surface 92 and the suction side surface 94 extend between and to the base end 80 and the tip end 82. The pressure side surface 92 and the suction side surface 94 extend between and to the leading edge 84 and the trailing edge 86. The platform 76 may form a portion of an inner radial airflow surface 96 through the compressor section 24 (see FIG. 1). The root 78 is disposed radially inward of the platform 76. The root 78 is configured for mounting the blade 70 of FIG. 3 to a rotor disk, such as the disk 68 of FIG. 2.

During operation of a gas turbine engine, rotor blades (e.g., the compressor rotor blades 70), are subject to many forces that increase the stress on the blades as well as induce dynamic excitations within the blades. The durability and life of a rotor blade can be limited by a significant overlap of dynamic and steady stresses on the rotor blade. For example, a high, localized steady stress near a region of high vibratory stress may lead to rotor blade degradation and reduced operational life. Minimizing the overlap of these dynamic and steady stresses may, therefore, result in more durable rotor blades.

In particular, we have found that the introduction of a localized, high surface curvature to a stress region of concern (e.g., having significant overlap of dynamic and steady stresses) may stiffen the local region effectively moving the high, localized steady stress and, thereby, preventing the overlap of these dynamic and steady stresses on the rotor blade.

Figure 4:
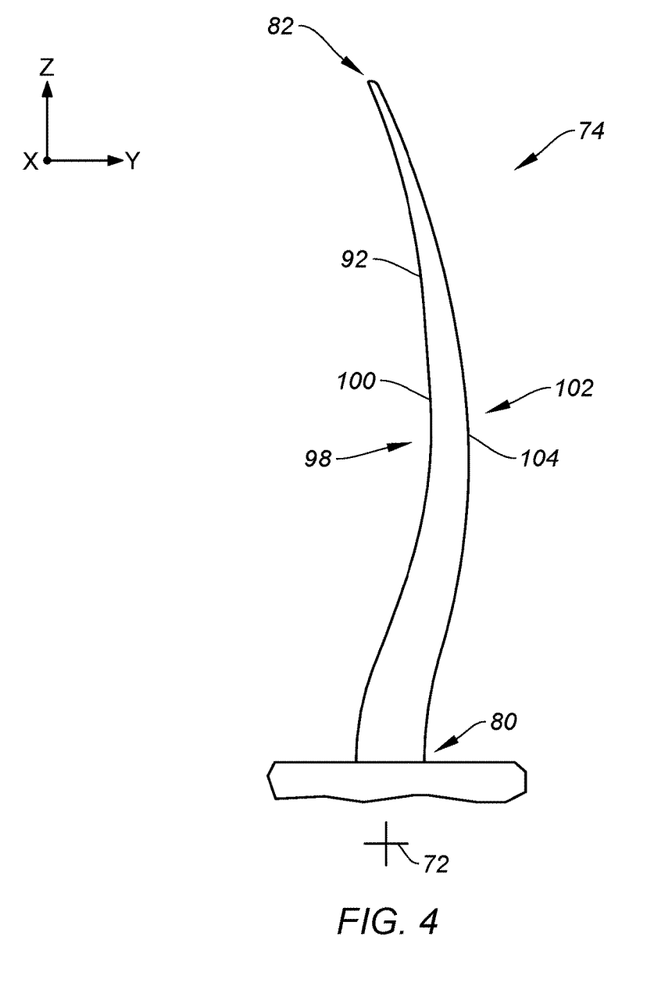
FIG. 4 illustrates a front, cutaway view of a rotor blade showing a pressure side surface and a suction side surface of the rotor blade, in accordance with one or more embodiments of the present disclosure.
Figure 5:
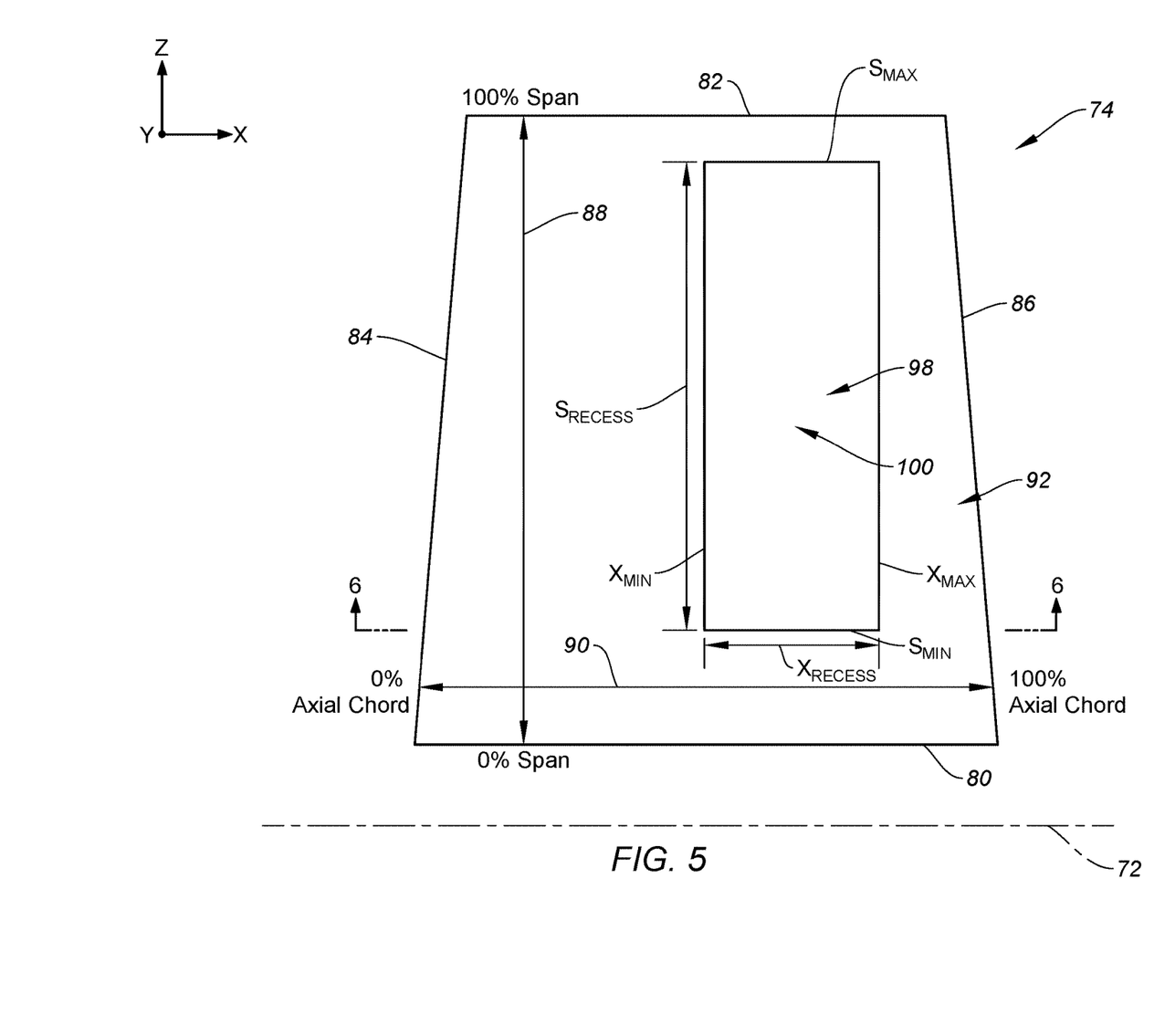
FIG. 5 illustrates a side view of the rotor blade of FIG. 4 showing the pressure side surface, in accordance with one or more embodiments of the present disclosure.
Figure 6:
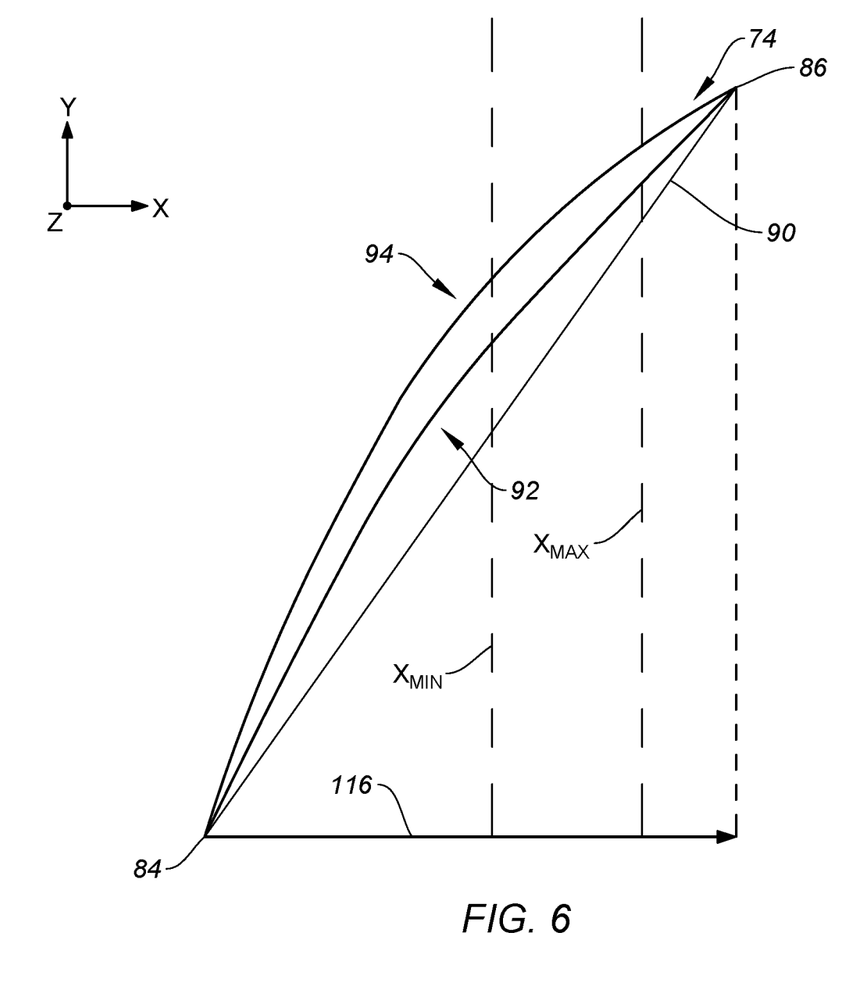
FIG. 6 illustrates a cross-sectional view of the rotor blade of FIG. 4 taken along Line 6-6 of FIG. 5, in accordance with one or more embodiments of the present disclosure.

Referring to FIGS. 4-6, the blade body 74 includes a recess 98 forming a recess surface portion 100 of the pressure side surface 92. The recess surface portion 100 may extend inward (e.g., into the blade body 74) from the surrounding portions of the pressure side surface 92. The recess surface portion 100 may deviate from the shape (e.g., the generally concave shape) of the surrounding portions of the pressure side surface 92. FIG. 4 illustrates a cutaway view of the blade body 74 along a plane orthogonal to the rotational axis 72, denoted as the X-axis herein, and showing the recess 98 and recess surface portion 100. FIG. 5 shows a location of the recess 98 on the pressure side surface 92. FIG. 6 shows a cross-section view of the blade body 74 taken along Line 6-6 of FIG. 5.

The recess 98 is disposed within a recess span $S_{RECESS}$ extending, in the span 88 direction from the base end 80 to the tip end 82, between and to a minimum span position ($S_{MIN}$) and a maximum span position ($S_{MAX}$). The $S_{MIN}$ position may be less than or equal to a 15 percent position of the span 88 (e.g., a position at 15 percent of the span 88 from the base end 80 toward the tip end 82) or, more preferably, less than or equal to a 40 percent position of the span 88. For example, the $S_{MIN}$ position may be disposed at the 40 percent position of the span 88. The $S_{MAX}$ position may be greater than or equal to a 90 percent position of the span 88. For example, the $S_{MAX}$ position may be disposed at the 90 percent position of the span 88. The $S_{MIN}$ position and the $S_{MAX}$ position of FIG. 5 are shown at the 15 percent span 88 position and the 90 percent span 88 position, respectively, however, as discussed above, the present disclosure is not limited to this particular recess span $S_{RECESS}$ of the recess 98. The cross-sectional view of FIG. 6 is taken at the $S_{MIN}$ position of FIG. 5 (e.g., at the 15 percent span 88 position).

As shown in FIG. 6, the blade body 74 has an axial chord 116. The axial chord 116 is representative of an extent of the chord 90 in the axial direction, relative to the rotational axis 72. The axial chord 116 extends axially between and to an axial position of the leading edge 84 and an axial position of the trailing edge 86. The recess 98 is disposed within a recess axial chord $X_{RECESS}$ extending (i.e., axially extending) between and to a minimum chord position ($X_{MIN}$) of the axial chord 116 and a maximum chord position ($X_{MAX}$) of the axial chord 116. The $X_{MIN}$ and the $X_{MAX}$ positions are defined at the $S_{MIN}$ position. The $X_{MIN}$ position may be greater than or equal to a 50 percent position of the axial chord 116 (e.g., a position at 50 percent of the axial chord 116 from the leading edge 84 toward the trailing edge 86). The $X_{MAX}$ position may be less than or equal to an 80 percent position of the axial chord 116. For example, the recess axial chord $X_{RECESS}$ extends between and to the $X_{MIN}$ position and the $X_{MAX}$ position, 50% axial chord$\leq X_{MIN}$ position$<X_{MAX}$ position, and the $X_{MIN}$ position$<X_{MAX}$ position$\leq 80\%$ axial chord. The $X_{MIN}$ position and the $X_{MAX}$ position of FIGS. 5 and 6 are shown at the 50 percent axial chord 116 position and the 80 percent axial chord 116 position, respectively, however, as discussed above, the present disclosure is not limited to this particular recess axial chord $X_{RECESS}$ of the recess 98.

The position and shape of the recess 98, at a position on the blade body 74 which might otherwise exhibit significant dynamic and steady stresses, facilitates greater blade body 74 durability and improved operational life, in comparison to at least some conventional rotor blades of which we are aware. By limiting the recess 98 to a particular range of the recess span $S_{RECESS}$ and the recess axial chord $X_{RECESS}$, as previously discussed, a reduction in aerodynamic performance of the blade body 74 (e.g., due to the recess 98) may be minimized.

As shown in FIG. 4, the blade body 74 may further include a bulge 102 forming a bulge surface portion 104 of the suction side surface 94. The bulge surface portion 104 may extend outward (e.g., out of the blade body 74) from the surrounding portions of the suction side surface 94. The bulge surface portion 104 may deviate from the shape (e.g., the generally convex shape) of the surrounding portions of the suction side surface 94. The bulge 102 may be disposed opposite the blade body 74 from the recess 98. For example, the bulge 102 may be disposed coincident with the recess 98 in a direction of the chord 90.

Figure 7:
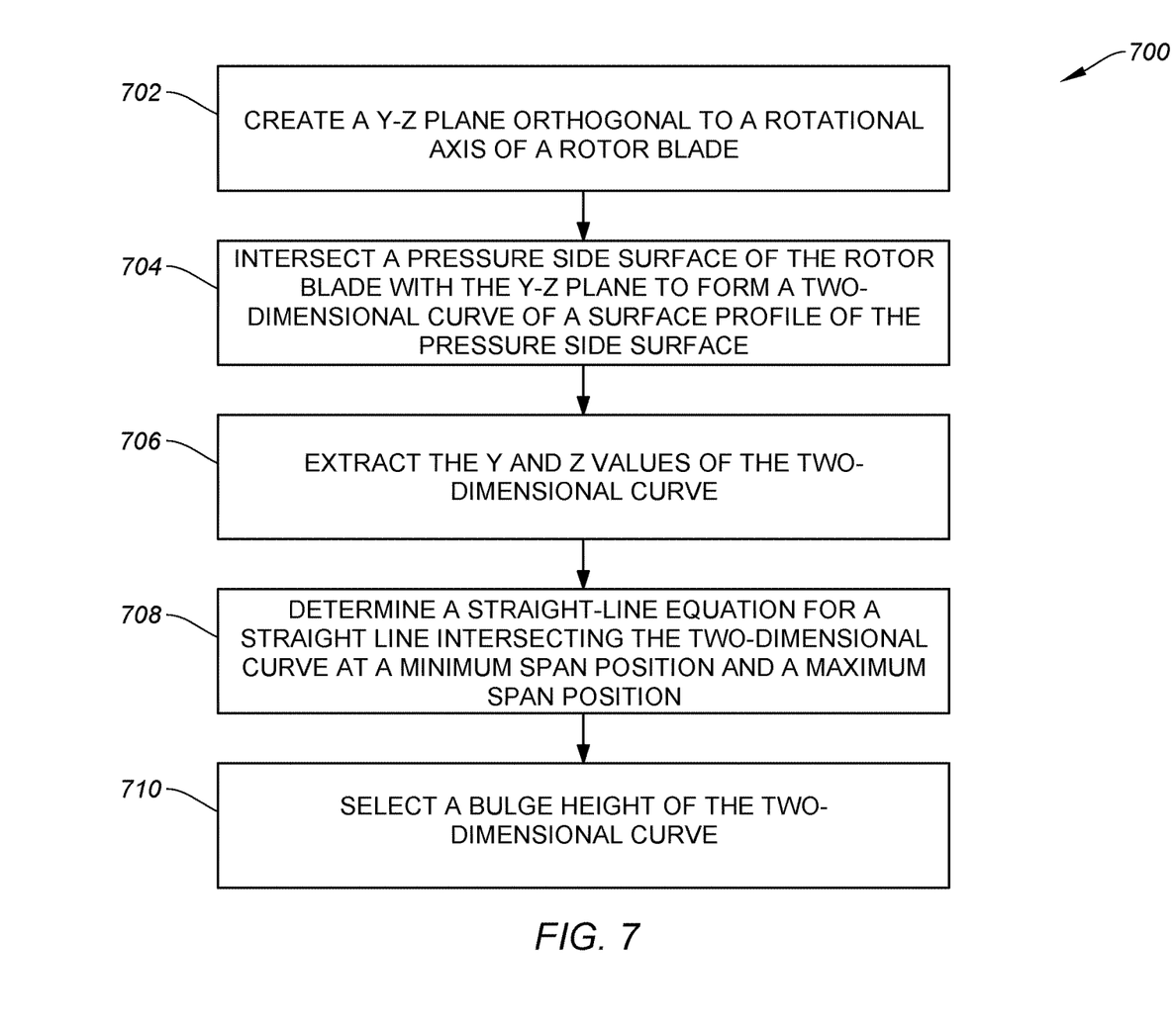
FIG. 7 illustrates a block diagram depicting a method for determining a geometric shape of a rotor blade, in accordance with one or more embodiments of the present disclosure.

Referring to FIG. 7, with continued reference to FIGS. 4 and 5, a method 700 for determining a geometric shape of a rotor blade (e.g., a compressor rotor blade; the rotor blades 70) is provided. The method 700 may be performed, for example, as part of a design process for a rotor blade. FIG. 7 illustrates a flowchart for the Method 700. The method 700 will be described herein with respect to the blade body 74. However, it should be understood that the method 700 is not limited to use with any particular rotor blade or rotor blade body. Unless otherwise noted herein, it should be understood that the steps of method 700 are not required to be performed in the specific sequence in which they are discussed below and, in some embodiments, the steps of the method 700 may be performed separately or simultaneously.

As will be discussed in further detail, the geometric shape of the blade body 74 and, in particular, the three-dimensional shape of the recess 98, may be defined using two-dimensional curves identified using a plurality of slices (e.g., planar representations) of the pressure side surface 92. Each of the slices may be taken in the span 88 direction with the slices covering the pressure side surface 92 (e.g., the recess surface portion 100) in the axial direction, relative to the rotational axis 72, from the $X_{MIN}$ position to the $X_{MAX}$ position. In particular, a recess height H of the recess surface portion 100 for each of the slices may be determined using the following steps of the method 700.

Figure 8:
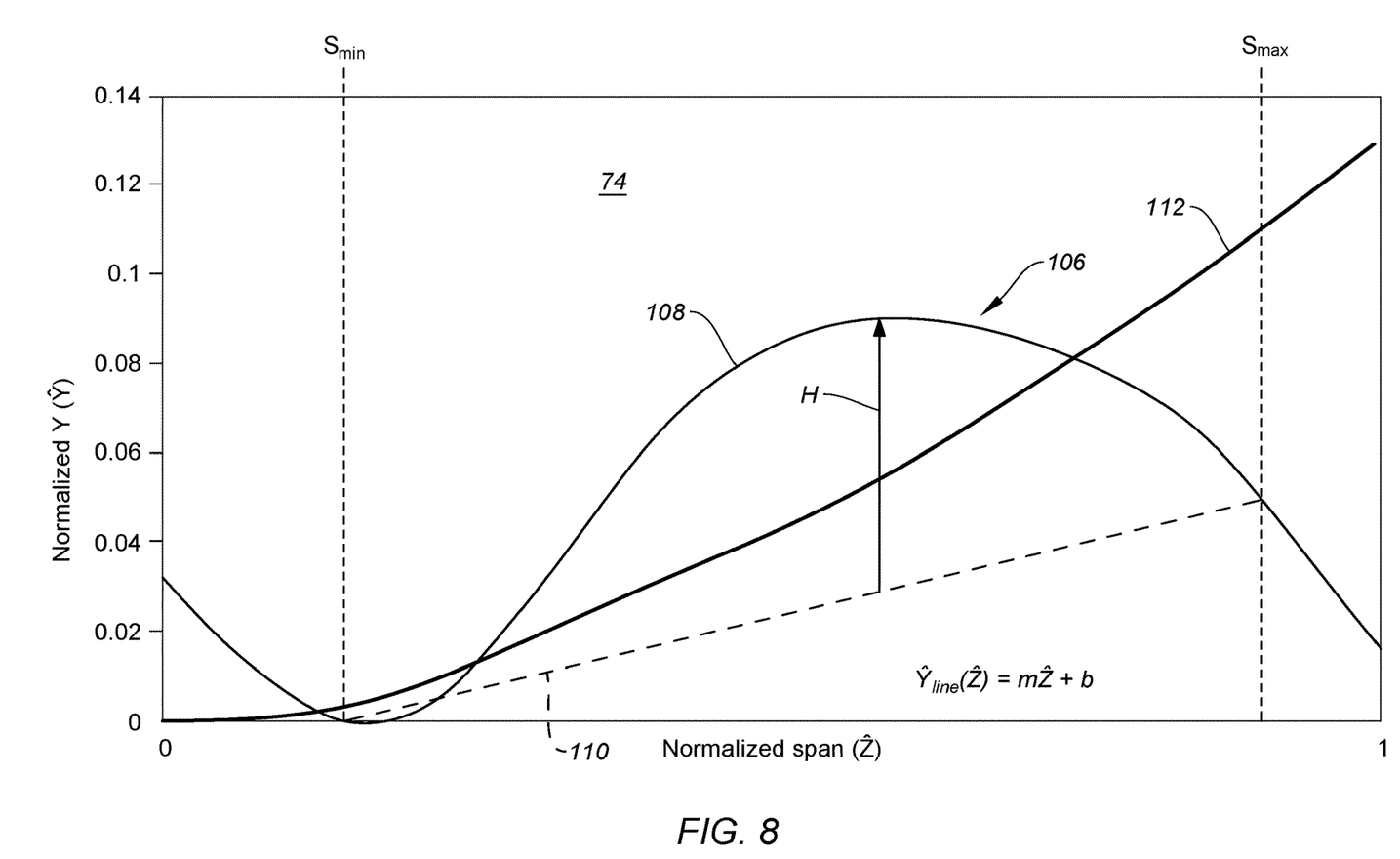
FIG. 8 illustrates a graphical representation of a recess surface profile of a pressure side surface of the rotor blade of FIG. 4 for a given rotational axis position, in accordance with one or more embodiments of the present disclosure.

Step 702 includes creating (e.g., observing, modeling, etc.) a Y-Z plane that is orthogonal to the rotational axis, where $X_{MIN} \leq X \leq X_{MAX}$. FIG. 8 graphically illustrates portions of the blade body 74 along the Y-Z plane for a given value of X. The blade body 74 is assumed herein to be oriented at a top-dead-center position of the bladed rotor 66 such that the Z-axis extends from the base end 80 to the tip end 82 (e.g., in the span 88 direction) and/or such that the Z-axis passes through the center of gravity of the blade body 74 (e.g., in a Z-direction). The Y-axis is orthogonal to the resulting X-axis and Z-axis following the right-hand-rule. Accordingly, the Y-axis and the Z-axis form a plane (e.g., the Y-Z plane) which is orthogonal to the X-axis.

Step 704 includes intersecting the Y-Z plane with the pressure side surface 92 to obtain a two-dimensional curve of the of a surface profile 106 of the pressure side surface 92 that lies on the Y-Z plane (e.g., between $S_{MIN}$ and $S_{MAX}$). As will be discussed in further detail, the two-dimensional curve, when viewed in the positive X-direction, will be used to define the recess height H for the recess surface portion 100 along the Y-Z plane for a given X position value.

Step 706 includes extracting the Y and Z coordinates of the two-dimensional curve of the of a surface profile 106. Step 706 may further include normalizing the values of the Y and Z coordinates using the following equations [1]-[3]:

$$\hat{Y} = \frac{(Y - Y_{MIN})}{\text{span}} \quad [1]$$

$$\hat{Z} = \frac{(Z - Z_{MIN})}{\text{span}} \quad [2]$$

$$\text{span} = \sqrt{(Z_{TIP} - Z_{BASE})^2 + (Y_{TIP} - Y_{BASE})^2} \quad [3]$$

where Y is a Y coordinate on the two-dimensional curve, $Y_{MIN}$ is a minimum value of Y for the two-dimensional curve, Z is a Z coordinate on the two-dimensional curve, $Z_{MIN}$ is a minimum value of Z for the two-dimensional curve, $Z_{TIP}$ is a Z coordinate of the two-dimensional curve at the tip end 82, $Z_{BASE}$ is a Z coordinate of the two-dimensional curve at the base end 80, $Y_{TIP}$ is a Y coordinate of the two-dimensional curve at the tip end 82, and Y BASE is a Y coordinate of the two-dimensional curve at the base end 80. FIG. 8 illustrates a two-dimensional curve 108 of the surface profile 106 with normalized Y and Z coordinates.

Step 708 includes determining (e.g., calculating) a straight-line equation $\hat{Y}_{LINE}(\hat{Z})=m\hat{Z}+b$ for the two-dimensional curve 108. The straight-line equation is defined by connecting the two extremum points of the two-dimensional curve located at the $S_{MIN}$ position and the $S_{MAX}$ position, where m is a slope of the straight line and b is the $\hat{Y}$-intercept. FIG. 8 illustrates a straight line 110 defined by the straight-line equation for the two-dimensional curve 108.

Step 710 includes selecting the recess height H. A value of the recess height H (e.g., in the Y-direction) of the two-dimensional curve 108 (e.g., the surface profile 106 of the recess surface portion 100) may be determined (e.g., calculated) for a given X-position (e.g., a given slice of the recess surface portion 100). The recess height H is a maximum difference between the Y coordinates of the two-dimensional curve 108 and the $\hat{Y}_{LINE}$ value of the straight line, in the Y-direction, using the following equation [4]:

$$H=\max(\hat{Y}(\hat{Z})-\hat{Y}_{LINE}(\hat{Z}))\qquad[4],$$

along the two-dimensional curve 108 between the $S_{MIN}$ position and the $S_{MAX}$ position. The recess height H is selected such that a determined value of the recess height H for the blade body 74 (e.g., a design of the blade body 74), taken at a given value of X between $X_{MIN}$ and $X_{MAX}$, is $0.025\ \hat{Y} \le H \le 0.1\ \hat{Y}$ or, more preferably, $0.04\ \hat{Y} \le H \le 0.1\ \hat{Y}$. For comparison, FIG. 8 shows a pressure side surface profile 112 for a conventional compressor blade alongside the two-dimensional curve 108 of the surface profile 106. For values of $\hat{Y}$ less than about 0.025, the recess 98 may not sufficiently minimize overlap of the blade body 74 dynamic and steady stresses. For values of $\hat{Y}$ greater than about 0.1, detrimental effects of the recess 98 on the blade body 74 efficiency and/or structural characteristics may overcome improvements to blade body 74 durability.

The steps of the method 700 (e.g., steps 702, 704, 706, 708, and/or 710) are repeated for the range of X values between and including the $X_{MIN}$ position and the $X_{MAX}$ position (e.g., for a plurality of values of X between $X_{MIN}$ and $X_{MAX}$) to define the shape of the recess 98 (e.g., the recess surface portion 100) between and to the $X_{MIN}$ position and the $X_{MAX}$ position. The present disclosure blade body 74, including the recess 98, may be manufactured using any rotor blade manufacturing process conventionally known in the art including, but not limited to, machining, metal casting, additive manufacturing, and the like. The blade body 74 may be a discrete rotor component configured for installation and mounting on a rotor disk. Alternatively, the blade body 74 may be formed as a unitary component of a rotor disk (e.g., an integrated blade rotor (IBR) or "blisk").

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:
   a bladed rotor configured for rotation about a rotational axis, the bladed rotor includes a plurality of rotor blades, and each rotor blade of the plurality of rotor blades includes a blade body,
   the blade body extends between and to a base end and a tip end, the blade body has a blade span extending between and to the base end and the tip end, the blade body extends between and to a leading edge and a trailing edge, the blade body has a blade chord extending between and to the leading edge and the trailing edge, the blade body forms a pressure side surface and a suction side surface, each of the pressure side surface and the suction side surface extend between and to the base end and the tip end and between and to the leading edge and the trailing edge, the blade body forms a recess at the pressure side surface, the recess includes a recess surface portion forming a portion of the pressure side surface, and the recess surface portion has a recess height, and the recess height is greater than or equal to a Y-value of 0.025 for a normalized two-dimensional curve of a surface profile of the recess surface portion taken along a Y-Z plane orthogonal to the rotational axis for a recess span, a Z-direction of the Y-Z plane extends in a span direction of the blade span, a Y-direction of the Y-Z plane extends orthogonal to the Z-direction, the recess span extends between and to a minimum span position and a maximum span position in the Z-direction, and the recess height is a maximum height measured in the Y-direction between the two-dimensional curve and a straight line intersecting the two-dimensional curve at the minimum span position and the maximum span position.

2. The aircraft propulsion system of claim 1, wherein the recess height is less than or equal to the Y-value of 0.1.

3. The aircraft propulsion system of claim 2, wherein the recess height is greater than or equal to the Y-value of 0.04.

4. The aircraft propulsion system of claim 1, wherein the minimum span position is equal to 15 percent of the blade span and the maximum span position is equal to 90 percent of the blade span.

5. The aircraft propulsion system of claim 1, wherein the minimum span position is equal to 40 percent of the blade span and the maximum span position is equal to 90 percent of the blade span.

6. The aircraft propulsion system of claim 1, wherein the recess extends axially along an axial chord of the blade chord between and to a minimum axial chord position and a maximum axial chord position, the minimum axial chord position is greater than or equal to 50 percent of the axial chord and the maximum axial chord position is less than or equal to 80 percent of the axial chord.

7. The aircraft propulsion system of claim 6, wherein the recess height is greater than or equal to the Y-value of 0.025 between and to the minimum axial chord position and the maximum axial chord position.

8. The aircraft propulsion system of claim 1, wherein the recess surface portion has a first recess shape which deviates from a second pressure side shape of surrounding portions of the pressure side surface.

9. The aircraft propulsion system of claim 1, wherein the blade body forms a bulge at the suction side surface coincident with the recess along the blade chord, the bulge includes a bulge surface portion forming a portion of the suction side surface, and the bulge surface portion has a first bulge shape which deviates from a second suction side shape of surrounding portions of the suction side surface.

10. The aircraft propulsion system of claim 1, further comprising a compressor section, and the compressor section includes the bladed rotor.

11. A rotor blade for a bladed compressor rotor of an aircraft propulsion system, the rotor blade comprising:

a blade body extending between and to a base end and a tip end, the blade body has a blade span extending between and to the base end and the tip end, the blade body extends between and to a leading edge and a trailing edge, the blade body has a blade chord extending between and to the leading edge and the trailing edge, the blade body forms a pressure side surface and a suction side surface, each of the pressure side surface and the suction side surface extend between and to the base end and the tip end and between and to the leading edge and the trailing edge, the blade body forms a recess at the pressure side surface, and the recess includes a recess surface portion forming a portion of the pressure side surface, the recess is disposed within a recess span extending in a span direction of the blade span, the recess span extends between and to a minimum span position and a maximum span position, the minimum span position is less than or equal to 40 percent of the blade span, and the maximum span position is equal to 90 percent of the blade span, and the recess is disposed within a recess chord extending in a chord direction of the blade chord, the recess chord extends between and to a minimum chord position and a maximum chord position, and the recess chord is a portion of the blade chord, and the recess surface portion has a first recess shape which deviates from a second pressure side shape of surrounding portions of the pressure side surface.

12. The rotor blade of claim 11, wherein the blade body forms a bulge at the suction side surface coincident with the recess along the blade chord, and the bulge includes a bulge surface portion forming a portion of the suction side surface.

13. The rotor blade of claim 12, wherein the bulge surface portion has a first bulge shape which deviates from a second suction side shape of surrounding portions of the suction side surface.

14. The rotor blade of claim 11, wherein the minimum span position is equal to 40 percent of the blade span.

* * * * *